(12) United States Patent
Kangshang et al.

(10) Patent No.: US 9,710,847 B2
(45) Date of Patent: Jul. 18, 2017

(54) METHOD AND TERMINAL FOR SUBMITTING ORDER (71) Applicant: Xiaomi Inc., Beijing (CN)

(72) Inventors: Mingxue Kangshang, Beijing (CN); Junqi Lin, Beijing (CN); Lina Xu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/473,136

(22) Filed: Aug. 29, 2014

(65) Prior Publication Data

US 2015/0120511 A1 Apr. 30, 2015

Related U.S. Application Data (63) Continuation of application No. PCT/CN2014/077479, filed on May 14, 2014.

(30) Foreign Application Priority Data

Oct. 25, 2013 (CN) .......................... 2013 1 0514083

(51) Int. Cl.
*G06Q 30/06* (2012.01)
*H04W 4/00* (2009.01)
*H04B 5/00* (2006.01)

(52) U.S. Cl.
CPC ..... *G06Q 30/0635* (2013.01); *G06Q 30/0613* (2013.01); *H04W 4/008* (2013.01); *H04B 5/0031* (2013.01)

(58) Field of Classification Search
CPC ..................................................... G06Q 30/00
See application file for complete search history.

(56) References Cited

U.S. PATENT DOCUMENTS

2002/0049656 A1* 4/2002 Lancos ................ G06Q 20/32
705/35
2004/0103407 A1* 5/2004 Blaukopf ................ G06F 8/00
717/140

(Continued)

FOREIGN PATENT DOCUMENTS

CN 102479371 A 5/2012
CN 102857500 A 1/2013

(Continued)

OTHER PUBLICATIONS

International Search Report of PCT/CN2014/077479, mailed from the State Intellectual Property Office of China on Aug. 13, 2014.

(Continued)

*Primary Examiner* — Kathleen Palavecino
*Assistant Examiner* — Abby Flynn
(74) *Attorney, Agent, or Firm* — Finnegan, Henderson, Farabow, Garrett & Dunner LLP (57) ABSTRACT

A method for submitting an order for use in a terminal, includes: scanning a pre-generated near field communication (NFC) tag to obtain tag data, the tag data including an identification code of a service provider and transaction information; generating an order according to the identification code, the transaction information, and user information; and sending the order to the service provider corresponding to the identification code.

15 Claims, 4 Drawing Sheets

(56) References Cited

U.S. PATENT DOCUMENTS

| | | | |
|---|---|---|---|
| 2005/0036620 A1* | 2/2005 | Casden | G06F 21/6209 380/259 |
| 2005/0055283 A1* | 3/2005 | Zarovinsky | G06Q 10/087 705/26.1 |
| 2005/0125745 A1* | 6/2005 | Engestrom | G06F 1/1626 715/847 |
| 2008/0004985 A1* | 1/2008 | Kang | G06Q 30/06 705/26.81 |
| 2008/0109320 A1* | 5/2008 | Kleinhans | G06Q 20/3278 705/26.1 |
| 2010/0294835 A1* | 11/2010 | Bam | G06Q 20/28 235/382 |
| 2012/0004972 A1 | 1/2012 | Wengrovitz et al. | |
| 2012/0101885 A1 | 4/2012 | Lee et al. | |
| 2012/0123884 A1* | 5/2012 | Bhasin | G07G 1/14 705/21 |
| 2013/0151380 A1* | 6/2013 | Holt | G06Q 10/087 705/26.81 |
| 2013/0191229 A1* | 7/2013 | Rodgers | G06Q 30/06 705/15 |
| 2013/0237152 A1* | 9/2013 | Taggar | H04B 5/00 455/41.1 |
| 2013/0304804 A1* | 11/2013 | Glasser | H04L 29/08522 709/203 |
| 2013/0317949 A1* | 11/2013 | Gu | G06Q 30/06 705/26.81 |
| 2014/0279188 A1* | 9/2014 | Powell | G06Q 30/0631 705/26.7 |

FOREIGN PATENT DOCUMENTS

| | | |
|---|---|---|
| CN | 102938117 | 2/2013 |
| CN | 102946484 A | 2/2013 |
| CN | 102982446 A | 3/2013 |
| CN | 103023925 A | 4/2013 |
| CN | 103034954 A | 4/2013 |
| CN | 103093261 | 5/2013 |
| CN | 103186871 A | 7/2013 |
| CN | 103559516 | 2/2014 |
| CN | 103559518 | 2/2014 |
| JP | 2001-306666 A | 11/2001 |
| JP | 2004-171368 A | 6/2004 |
| JP | 2005-078148 A | 3/2005 |
| JP | 2011-204227 A | 10/2011 |
| KR | 10-2007-0077046 A | 7/2007 |
| KR | 10-2009-0000735 A | 1/2009 |
| KR | 10-2012-0116287 A | 10/2012 |
| KR | 10-2013-0103850 A | 9/2013 |
| KR | 10-2013-0111753 | 10/2013 |
| RU | 103020 U1 | 3/2011 |
| WO | WO 2013/090367 A1 | 6/2013 |
| WO | WO 2013/109320 A1 | 7/2013 |

OTHER PUBLICATIONS

European Search Report for Application No. 14188525.1, from the European Patent Office, dated Jan. 5, 2015.

English version of Search Report of International Application No. PCT/CN2014/077479 mailed from the State Intellectual Property Office of the P.R. China, dated Aug. 13, 2014.

Notification on Results of Estimation of Patentability of Invention for Russian Application No. 2015122178/08(031872), dated Jun. 9, 2016.

Decision on Grant of a Patent for Invention for Russian Application No. 2015122178/08(034519), dated Feb. 1, 2017.

* cited by examiner

METHOD AND TERMINAL FOR SUBMITTING ORDER

CROSS REFERENCE TO RELATED APPLICATION

The present application is a Continuation of International Application No. PCT/CN2014/077479, filed May 14, 2014, which claims priority of Chinese Patent Application No. 201310514083.1, filed Oct. 25, 2013, the entire contents of all of which is incorporated herein by reference.

TECHNICAL FIELD

The present disclosure generally relates to the field of electronic commerce and, more particularly, to a method and a terminal for submitting an order.

BACKGROUND

Near field communication (NFC), also known as short-range wireless communication, is a short-range high-frequency wireless communication technology, allowing non-contact point-to-point data transmission between electronic devices (e.g., within ten centimeters) to exchange data. The NFC technology evolves from contactless radio frequency identification (RFID), and is used in handheld devices, such as mobile phones, to provide machine-to-machine (M2M) communication.

NFC can be performed not only between two devices having NFC-recognition capabilities, but also between an NFC device and a non-power NFC chip, also known as an NFC sticker or an NFC tag. An NFC-equipped mobile phone can read programs pre-written by software in the NFC tag to perform tasks automatically.

Conventionally, the NFC tag is used in modification of the mobile phone's settings, sending of short messages, starting of applications and other functions, and those functions are limited within the mobile phone.

SUMMARY

According to a first aspect of the present disclosure, there is provided a method for submitting an order for use in a terminal, comprising: scanning a pre-generated near field communication (NFC) tag to obtain tag data, the tag data including an identification code of a service provider and transaction information; generating an order according to the identification code, the transaction information, and user information; and sending the order to the service provider corresponding to the identification code.

According to a second aspect of the present disclosure, there is provided a terminal, comprising: a processor; and a memory for storing instructions executable by the processor; wherein the processor is configured to: scan a pre-generated near field communication (NFC) tag to obtain tag data, the tag data including an identification code of a service provider and transaction information; generate an order according to the identification code, the transaction information, and user information; and send the order to the service provider corresponding to the identification code.

According to a third aspect of the present disclosure, there is provided a non-transitory storage medium having stored therein instructions that, when executed by a processor of a terminal, cause the terminal device to perform a method for submitting an order, the method comprising: scanning a pre-generated near field communication (NFC) tag to obtain tag data, the tag data including an identification code of a service provider and transaction information; generating an order according to the identification code, the transaction information, and user information; and sending the order to the service provider corresponding to the identification code to complete submission of the order.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

In exemplary embodiments, there is provided a method for submitting an order using a near field communication (NFC) tag. By scanning the NFC tag, a terminal can obtain data regarding a service request and generate an order, and then directly transmit the order to a service provider.

Figure 1:
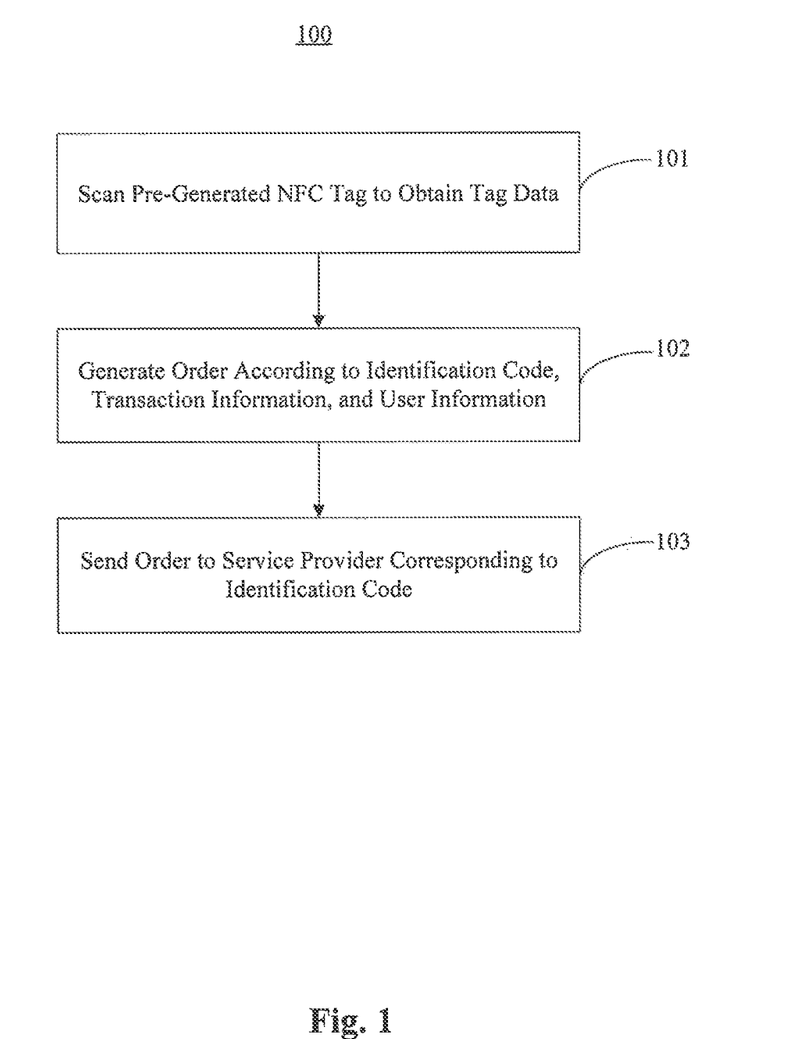
FIG. 1 is a flowchart of a method for submitting an order for use in a terminal, according to an exemplary embodiment.

FIG. 1 is a flowchart of a method 100 for submitting an order for use in a terminal, according to an exemplary embodiment. Referring to FIG. 1, the method 100 includes the following steps.

In step 101, the terminal scans a pre-generated NFC tag to obtain tag data, the tag data including an identification code of a service provider, such as a seller, and transaction information.

In step 102, the terminal generates an order according to the identification code, the transaction information, and user information.

In step 103, the terminal sends the order to the service provider corresponding to the identification code to complete submission of the order.

In exemplary embodiments, the transaction information is content of services ordered by the user. For example, if the NFC tag is used for ordering a takeout from a restaurant, the transaction information may be a name of the takeout, such as a combo type. Also for example, if the NFC tag is used for paying a phone bill, the transaction information may be an amount of the phone bill.

In the illustrated embodiment, because the tag data of the NFC tag contains the identification code of the service provider and the transaction information the terminal can determine the service provider according to the identification code, generate the corresponding order, and then send the order to the service provider. Therefore, the user may not need to use different service software or websites provided by different service providers, respectively, to submit orders. The terminal can recognize the service provider corresponding to the order based on the identification code, and send the order to the corresponding service provider. In this way, time for the user to obtain a service via the terminal may be saved, thereby improving convenience of obtaining services. In addition, service providers do not need to develop their own applications or build a website for a customer service system, thereby saving service cost and improving service efficiency.

In exemplary embodiments, step 103 includes converting a format of the order into a format supported by the service provider corresponding to the identification code, and sending the order in the converted format to the service provider corresponding to the identification code.

In the illustrated embodiment, different service providers may support different order formats. For example, a restaurant may have an order format different from that of a taxi company or a telephone company. Therefore, the terminal converts a format of an order into a format supported by the corresponding service provider before sending the order. For the user, the same format may be used to display different orders on the terminal, and there is no need for a variety of different formats of orders, which can save the time for the user to obtain services via the terminal, thereby improving the convenience of obtaining services. In addition, for service providers, there is no need to identify different formats of orders, thereby saving service cost and improving service efficiency.

In the illustrated embodiment, before step 101, the identification code of the service provider and the transaction information may be written into the NFC tag in advance. Thus, when placing an order, the user need not input that information, but simply scans the NEC tag using the terminal, and the information can be synthesized automatically into the order, which can save the time for the user to obtain the service, thereby improving the convenience of obtaining services.

In exemplary embodiments, the user information in step 102 may be obtained through first, second, and third methods.

In the first method, the user information is pre-stored in the NFC tag, and is obtained by the terminal when scanning the NFC tag.

In one exemplary embodiment, the user information is encrypted, and the encrypted user information is written into the NFC tag by the terminal. The terminal can obtain the tag data by scanning the pre-generated NFC tag, and then decrypt the encrypted user information to obtain the user information.

With the encryption of the user information, only the terminal is able to read the encrypted user information from the NFC tag, thereby improving the security of user privacy. In addition, because the user information is stored in the NFC tag in advance, when placing the order, the user need not input that information, but simply scans the NFC tag using the terminal, and the information can be synthesized automatically into the order, which can save the time for the user to obtain services, thereby improving the convenience of obtaining services.

In the second method, the user information is obtained locally from the terminal, or from user input. In this case, there may be no need to encrypt the user information. By storing the user information locally in the terminal or inputting the user information by the user, the security of the user privacy is improved, which can save the time for the user to obtain services, thereby improving the convenience of obtaining services.

In the third method, the user information is obtained via a sensor. For example, if the user wants to take a taxi, a location of the user is determined via a global positioning system (GPS) and the location is the obtained user information. Because the user information is obtained via a sensor, the accuracy and convenience of obtaining the user information may be improved. In addition, user input is reduced, and the time for the user to obtain the service is saved, thereby improving the convenience of obtaining the service.

Figure 2:
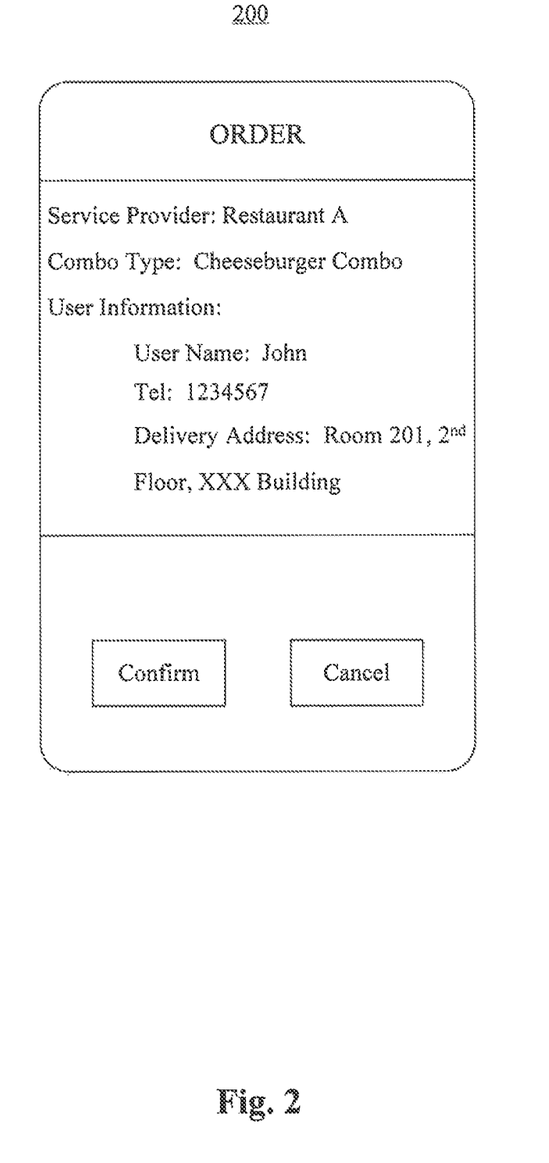
FIG. 2 is a schematic diagram of a user interface for submitting an order, according to an exemplary embodiment.

FIG. 2 is a schematic diagram of a user interface 200 for submitting an order, according to an exemplary embodiment. In the illustrated embodiment, the following information is written into an erasable NFC tag with the terminal in advance:

Service provider ID: 000001 (Restaurant A)

Transaction Information: Combo Type: Cheeseburger combo,

User Information:

User Name: John,

Tel: 1234567,

Delivery Address: Room 201, $2^{nd}$ floor, XXX Building

When the terminal scans the NFC tag, an order as shown in FIG. 2 will be displayed on the user interface 200 of the terminal. After the user confirms the order, the terminal sends the order to Restaurant A, and then Restaurant A can receive this order so as to deliver the order to the user.

In the above embodiment, the user only needs to use the terminal to scan the NFC tag and confirm the order displayed on the user interface 200, without the need to input names of food to be ordered and the user information needed for ordering, which can save the time for the user to obtain services via the terminal, thereby improving the convenience of obtaining services.

In exemplary embodiments, the terminal can receive in real time order status information generated by the service provider in accordance with a processing situation of the order. With the real-time access to the order status information by the terminal, the user can learn the processing situation of the order in real time, thereby improving the convenience of obtaining services.

In exemplary embodiments, the terminal performs statistics on user consumption information according to the order. For example, the terminal performs statistics of a total number of times that the user places orders, wherein, a first number of times that the user places orders to a first service provider, such as a restaurant, a second number of times that the user places orders to a second service provider, such as a taxi service provider, etc., and a consumption amount of each service.

In the illustrated embodiment, the terminal performs statistics on the user consumption information so that the user can be accurately provided with consumption records, which is convenient for the user to query past consumption records, thereby improving user experience.

Figure 3:
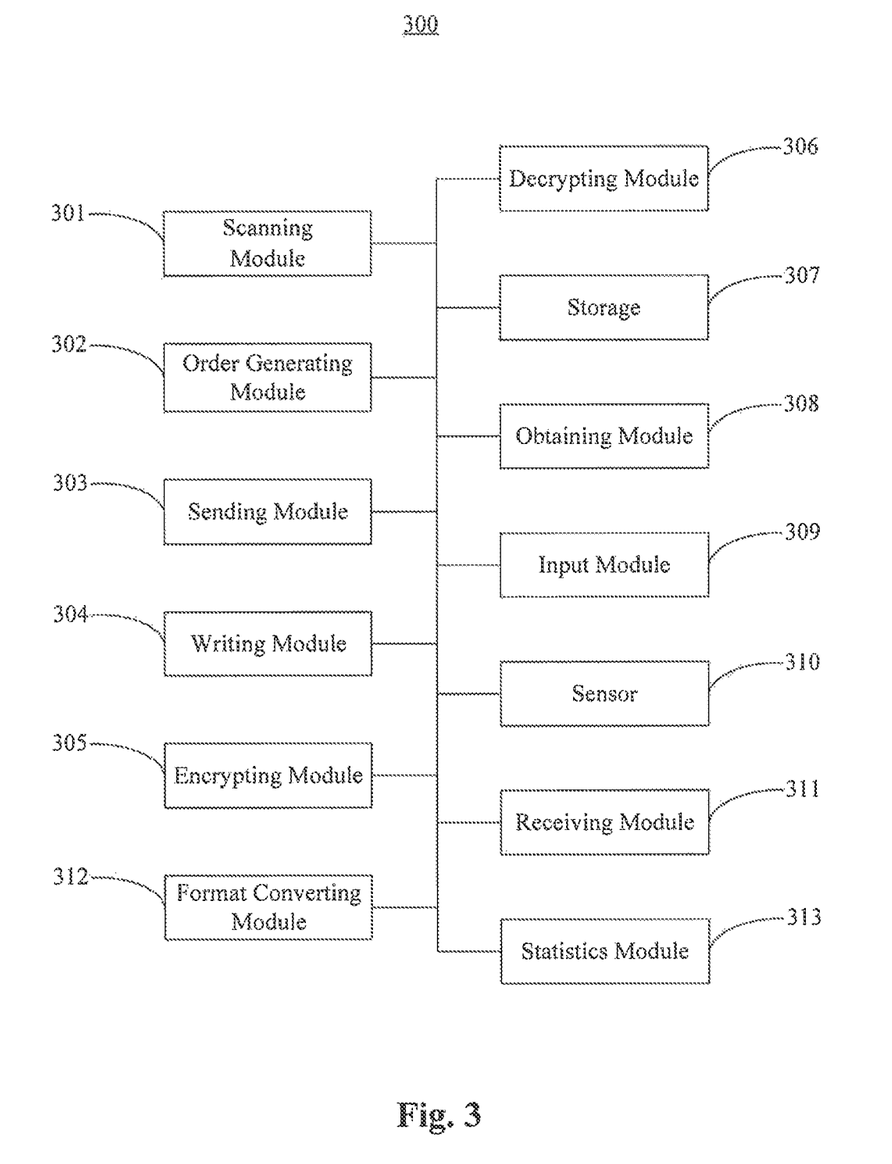
FIG. 3 is a block diagram of an apparatus for submitting an order, according to an exemplary embodiment.

FIG. 3 is a block diagram of an apparatus 300 for submitting an order, according to an exemplary embodiment. Referring to FIG. 3, the apparatus 300 includes a scanning module 301, an order generating module 302, and a sending module 303.

The scanning module 301 is configured to scan a pre-generated NFC tag to obtain tag data, the tag data including an identification code of a service provider, such as a seller, and transaction information.

The order generating module 302 is configured to generate an order according to the identification code, the transaction information, and user information.

The sending module 303 is configured to send the order to the service provider corresponding to the identification code to complete submission of the order.

In one exemplary embodiment, the apparatus 300 further includes a format converting module 312 configured to convert a format of the order into a format supported by the service provider corresponding to the identification code. The sending module 303 is further configured to send the order in the converted format to the service provider corresponding to the identification code.

In one exemplary embodiment, the apparatus 300 further includes a writing module 304 configured to write the identification code of the service provider and the transaction information into the NFC tag.

In one exemplary embodiment, the apparatus 300 further includes an encrypting module 305 and a decrypting module 306. The encrypting module 305 is configured to encrypt the user information for the writing module 304 to write the encrypted user information into the NFC tag. The decrypting module 306 is configured to decrypt the encrypted user information to obtain the user information.

In one exemplary embodiment, the apparatus 300 further includes a storage 307 configured to store the user information, and an obtaining module 308 configured to obtain the user information from the storage 307. Alternatively/additionally, the apparatus 300 further includes an input module 309 configured to obtain the user information from user input.

In one exemplary embodiment, the apparatus 300 further includes a sensor 310 configured to obtain the user information.

In one exemplary embodiment, the apparatus 300 further includes a receiving module 311 configured to receive, in real time, order status information generated by the service provider in accordance with the processing of the order.

In one exemplary embodiment, the apparatus 300 further includes a statistics module 313 configured to perform statistics on user consumption information according to the order.

Figure 4:
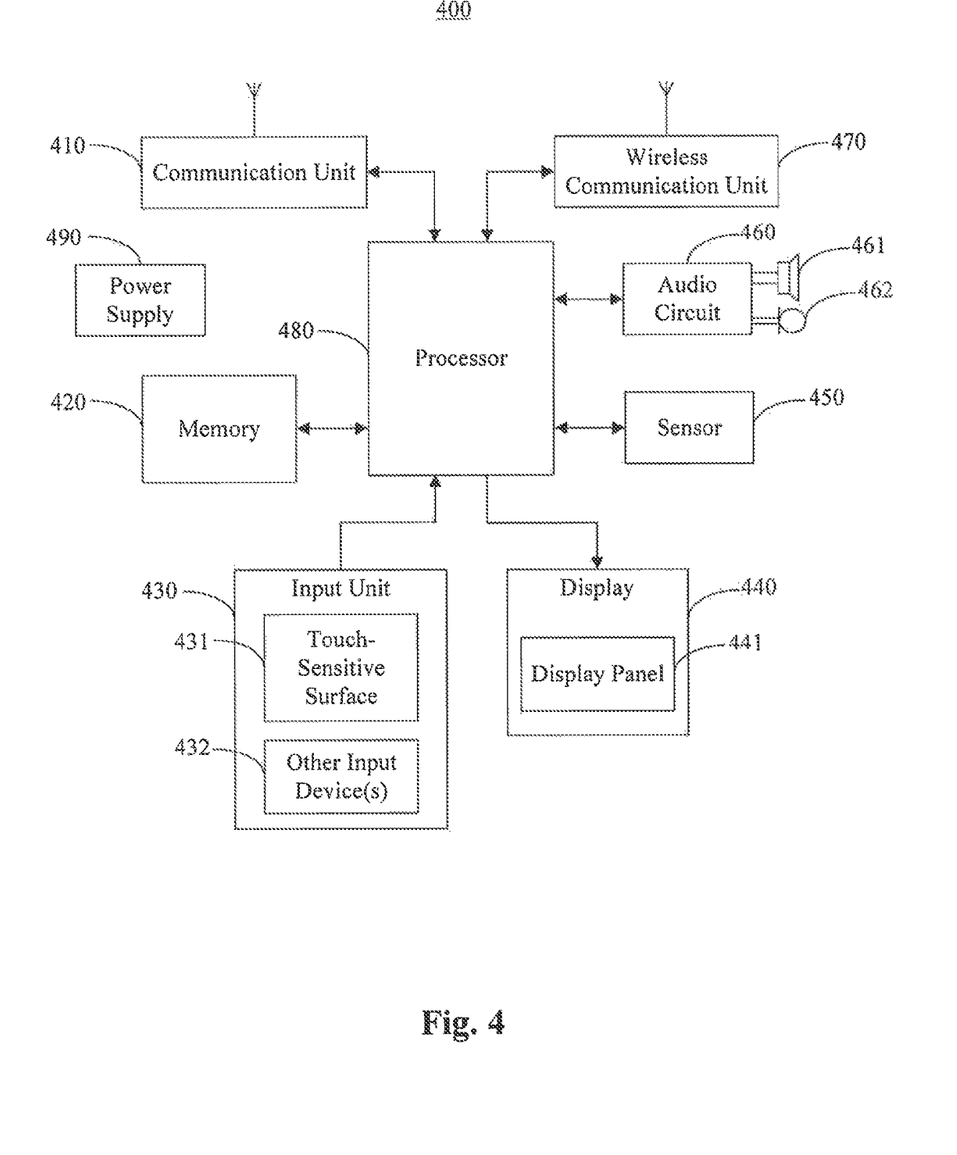
FIG. 4 is a block diagram of a terminal for submitting an order, according to an exemplary embodiment.

FIG. 4 is a block diagram of a terminal 400, according to an exemplary embodiment. The terminal 400 is configured to perform the method 100 (FIG. 1).

Referring to FIG. 4, the terminal 400 may include one or more of a communication unit 410, memory resources represented by a memory 420, an input unit 430, a display 440, a sensor 450, an audio circuit 460, a wireless communication unit 470, a processor 480 including one or more processing cores, and a power supply 490. Those skilled in the art could understand that the structure shown in FIG. 4 does not constitute a limitation to the terminal 400, and the terminal 400 may include more or less components than those shown in FIG. 4, or a combination of certain components, or may have different component arrangements.

The communication unit 410 is configured to receive and send signals during receiving and sending information or in a process of phone calling. The communication unit 410 may be a network communication apparatus such as a radio frequency (RF) circuit, a router, a modem, etc. For example, when the communication unit 410 is the RF circuit, the communication unit 410 receives downlink information from abase station, and sends the downlink information to the processor 480 to process. In addition, the communication unit 410 transmits uplink data to the base station. Generally, the RF circuit as the communication unit 410 includes an antenna, at least one amplifier, a tuner, one or more oscillators, a subscriber identity module (SIM) card, a transceiver, a coupler, a low noise amplifier (LNA), a duplexer, etc., but it is not limited thereto. Furthermore, the communication unit 410 may communicate with a network and other apparatuses by wireless communication. The wireless communication may use any communication standard or protocol including global system of mobile communication (GSM), general packet radio service (GPRS), code division multiple access (CDMA), wideband code division multiple access (WCDMA), long term evolution (LTE), E-mail, short messaging service (SMS) or the like, but it is not limited thereto.

The memory 420 is configured to store software programs and modules, and the processor 480 executes various functional applications and data processing by running the software programs and modules stored in the memory 420. The memory 420 may mainly include a program storing area and a data storing area. The program storing area may store an operating system, at least one application program required for functions such as a sound playing function, an image playing function or the like. The data storing area may store data such as audio data and a telephone book, etc., created in accordance with the use of the terminal 400. Furthermore, the memory 420 may include a high speed random access memory or a nonvolatile memory, for example, at least one magnetic disk storage device, a flash memory device or other nonvolatile solid-state memory devices. Correspondingly, the memory 420 may also include a storage controller, to provide the processor 480 and the input unit 430 with an access to the memory 420.

The input unit 430 is configured to receive input figure or character information, and generate a signal input of a keyboard, a mouse, an operating stick, an optical device, or a trackball related to user settings and function control. For example, the input unit 430 may include a touch-sensitive surface 431 and one or more other input apparatuses 432. The touch-sensitive surface 431, also referred to as a touch display screen or a touch panel, may collect touch operations from a user performed thereon or nearby (for example, operations on the touch-sensitive surface 431 or near the touch-sensitive surface 431 by a user using any appropriate object or accessory such as a finger, or a touch pen, etc.), and may drive a corresponding connecting device according to a preset program. For example, the touch-sensitive surface 431 may include first and second parts, i.e., a touch detection device and a touch controller. The touch detection device detects touch operations of the user, and detects signals caused by the touch operations, then transmits the signals to the touch controller. The touch controller receives touch information from the touch detection device, and converts the touch information into coordinates of touch points to be sent to the processor 480. The touch controller receives commands sent from the processor 480 and executes the commands. Furthermore, the touch-sensitive surface 431 may be realized in various types, such as a resistive type, a capacitive type, an infrared type, or a surface acoustic wave type. In addition to the touch-sensitive surface 431, the input unit 430 may also include one or more other input apparatuses 432. For example, the other input apparatuses 432 may include one or more of a physical keyboard, a function key (such as a volume control key, or a switching key, etc.), a trackball, a mouse, and an operating stick, but are not limited thereto.

The display 440 is configured to display information input by the user or information supplied to the user and various graphical user interfaces of the terminal 400. These graphical user interfaces may consist of graph, text, icon, video or any combination thereof. The display 440 may include a display panel 441. The display panel 441 may be configured by using a liquid crystal display (LCD), an organic light-emitting diode (OLED), or the like. Further, the touch-sensitive surface 431 may cover the display panel 441, and after the touch-sensitive surface 431 detects a touch operation thereon or nearby, the touch-sensitive surface 431 transmits the touch operation to the processor 480 to determine a type of the touch operation and, subsequently, the processor 480 provides a corresponding visual output on the display 441 according to the type of the touch operation. Although in FIG. 4 the touch-sensitive surface 431 and the display panel 441 be two separate parts to realize input and output functions, in some embodiments, the touch-sensitive surface 431 and the display panel 441 may be integrated to realize input and output functions.

The sensor 450 may be a light sensor, a motion sensor, or any other sensors. For example, the light sensor may include an ambient light sensor and a proximity sensor. The ambient light sensor may adjust a brightness of the display panel 441 according to a brightness of ambient light. The proximity sensor may turn off the display panel 441 and/or backlight when the terminal 400 moves to the user's ear. As an example of the motion sensor, a gravity acceleration sensor may detect values of accelerations in respective directions (such as along three-axis), and may detect a value and a direction of the gravity when in stationary state. The gravity acceleration sensor may be used in applications for identifying an attitude of the terminal 400 (such as horizontal and vertical screen switching, related games, magnetometer attitude calibration), related functions of vibration identification (such as a pedometer, a knock), etc. The terminal 400 may also be configured with other sensors such a gyroscope, a barometer, a hygrometer, a thermometer, an infrared sensor, etc.

The audio circuit 460 is coupled to a speaker 461 and a microphone 462, and may provide an audio interface between the user and the terminal 400. The audio circuit 460 may convert received audio data into electrical signals and transmit the electrical signals to the speaker 461, and then the speaker 461 converts the electrical signals into sound signals to output. On the other hand, the microphone 462 converts collected sound signals into electrical signals, and the audio circuit 460 receives the electrical signals and converts the electrical signals into audio data to output to the processor 480 for processing. The audio data is then sent to another terminal through the RF circuit as the communication unit 410, or to the memory 420 to be further processed. The audio circuit 460 may include an earplug jack, to provide communication between a peripheral headset and the terminal 400.

The wireless communication unit 470 may be a WiFi module configured to provide the user with a wireless broadband Internet access, which allows the user to receive and send emails, browse webpages, and access streaming media. Although FIG. 4 shows the wireless communication unit 470, it should be understood that the terminal 400 does not have to include the wireless communication unit 470, and may be omitted.

The processor 480 is a control center of the terminal 400 that connects various parts of the terminal 400 by using various interfaces and circuits, and executes various functions and data processing by executing the software programs and/or modules stored in the memory 420 and calling data stored in the memory 420. The processor 480 may include one or more processing cores, and may be integrated with an application processor and a modem processor. The application processor mainly processes an operating system, user interfaces, and application programs. The modem processor mainly processes wireless communication. In some embodiments, the modem processor may not be integrated into the processor 480.

The power supply 490 is configured to supply power to components of the terminal 400. For example, the power supply 490 may be logically coupled with the processor 480 by a power supply management system, thereby realizing functions such as management of charging, discharging, and power consumption by the power supply management system. The power supply 490 may also include any component such as one or more of a direct current (DC) power supply or alternating current (AC) power supply, a recharging system, a power supply failure detection circuit, a power, supply converter or inverter, a power supply state indicator.

Although not shown, the terminal 400 may also include a camera, a Bluetooth module, etc.

In exemplary embodiments, the terminal 400 may be various handheld terminal devices, such as a mobile phone, a personal digital assistant (PDA), etc. Therefore, the scope of the present disclosure is not to be limited to a certain type of terminal.

In exemplary embodiments, there is also provided a non-transitory storage medium having stored therein instructions, such as included in the memory 420, executable by the processor 480 in the terminal 400, for performing the method 100 (FIG. 1). The storage medium may be a volatile memory or a nonvolatile memory, or may include both of the volatile memory and the nonvolatile memory. As an example without limitation, the nonvolatile memory may include a read-only memory (ROM), a programmable ROM (PROM), an electrically programmable read-only memory ROM (EPROM), an electrically erasable programmable ROM (EEPROM) or a flash memory. The volatile memory may include a random access memory (RAM), which may function as an external cache memory. As an example without limitation, the RAM may be obtained in various types such as a synchronous RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM) and a directly Rambus RAM (DRRAM). The storage medium in the disclosure intends to include but not to be limited by those and other proper types of memories.

Various exemplary logic blocks, modules and circuits described in conjunction with the disclosure may be implemented by the following components that are designed to perform the above methods: a general-purpose processor, a digital signal processor (DSP), an application specific integrated circuit (ASIC), a field programmable gate array (FPGA) or other programmable logic devices, a discrete gate or transistor logic, a discrete hardware assemble or any combination of those components. The general-purpose processor may be a microprocessor. Alternatively, the processor may be any of a traditional processor, a controller, or a state machine. The processor may also be implemented by a combination of the computing devices such as a combination of a DSP and a microprocessor, a plurality of microprocessors, one or more microprocessors in conjunction with DSP core, or any other configurations.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for submitting an order implemented by a cell phone of a user, the method comprising:
   writing, by the cell phone, an identification code corresponding to a service provider, and transaction information corresponding to a product or service, into a near field communication (NFC) tag;
   scanning, by the cell phone, the NFC tag to obtain tag data, the tag data including the identification code corresponding to the service provider and the transaction information corresponding to the product or service;
   automatically synthesizing, by the cell phone, the identification code corresponding to the service provider, the transaction information corresponding to the product or service, and user information to generate an order for the user to acquire the product or service from the service provider, wherein the order is generated in a first format;
   displaying, by the cell phone on a display, the generated order in the first format and a menu for confirming the generated order;
   receiving, by the cell phone, a user selection from the menu to confirm the generated order;
   in response to receiving the user selection from the menu to confirm the generated order, converting, by the cell phone, the first format of the generated order into a second format supported by the service provider corresponding to the identification code; and
   sending, by the cell phone via a wireless network, the generated order in the second format to the service provider corresponding to the identification code to complete submission of the generated order.

2. The method of claim 1, wherein the writing comprises:
   encrypting, by the cell phone, the user information; and
   writing, by the cell phone, the encrypted user information into the NFC tag.

3. The method of claim 2, further comprising:
   decrypting, by the cell phone after the scanning, the encrypted user information to obtain the user information.

4. The method of claim 1, further comprising:
   obtaining, by the cell phone, the user information locally from the cell phone or from user input.

5. The method of claim 1, further comprising:
   obtaining, by the cell phone, the user information via a sensor.

6. The method of claim 1, further comprising:
   receiving in real time, by the cell phone via the wireless network, order status information generated by the service provider in accordance with a processing situation of the generated order.

7. The method of claim 1, further comprising:
   performing, by the cell phone, statistics on user consumption information according to the generated order.

8. A cell phone of a user, comprising:
   a processor; and
   a memory for storing instructions executable by the processor;
   wherein the processor is configured to:
   write an identification code corresponding to a service provider, and transaction information corresponding to a product or service, into a near field communication (NFC) tag;
   scan the NFC tag to obtain tag data, the tag data including the identification code corresponding to the service provider and the transaction information corresponding to the product or service;
   automatically synthesize the identification code corresponding to the service provider, the transaction information corresponding to the product or service, and user information to generate an order for the user to acquire the product or service from the service provider, wherein the order is generated in a first format;
   display, on a display, the generated order in the first format and a menu for confirming the generated order;
   receive a user selection from the menu to confirm the generated order;
   in response to receiving the user selection from the menu to confirm the generated order, convert the first format of the generated order into a second format supported by the service provider corresponding to the identification code; and
   send, via a wireless network, the generated order in the second format to the service provider corresponding to the identification code to complete submission of the generated order.

9. The cell phone of claim 8, wherein the processor is further configured to:
   encrypt the user information; and
   write the encrypted user information into the NFC tag.

10. The cell phone of claim 9, wherein the processor is further configured to:
    decrypt, after the scanning, the encrypted user information to obtain the user information.

11. The cell phone of claim 8, wherein the processor is further configured to:
    obtain the user information locally from the cell phone or from user input.

12. The cell phone of claim 8, wherein the processor is further configured to:
    obtain the user information via a sensor.

13. The cell phone of claim 8, wherein the processor is further configured to:

receive in real time, via the wireless network, order status information generated by the service provider in accordance with a processing situation of the generated order.

14. The cell phone of claim 8, wherein the processor is further configured to:

perform statistics on user consumption information according to the generated order.

15. A non-transitory storage medium having stored therein instructions that, when executed by a processor of a cell phone of a user, cause the cell phone to perform a method for submitting an order, the method comprising:

writing an identification code corresponding to a service provider, and transaction information corresponding to a product or service, into a near field communication (NFC) tag;

scanning the NFC tag to obtain tag data, the tag data including the identification code corresponding to the service provider and the transaction information corresponding to the product or service;

automatically synthesizing the identification code corresponding to the service provider, the transaction information corresponding to the product or service, and user information to generate an order for the user to acquire the product or service from the service provider, wherein the order is generated in a first format;

displaying, on a display, the generated order and a menu for confirming the generated order in the first format;

receiving a user selection from the menu to confirm the generated order;

in response to receiving the user selection from the menu to confirm the generated order, converting the first format of the generated order into a second format supported by the service provider corresponding to the identification code; and sending, via a wireless network, the generated order in the second format to the service provider corresponding to the identification code to complete submission of the generated order.

* * * * *